United States Patent [19]

Hamada et al.

[11] Patent Number: 4,796,842
[45] Date of Patent: Jan. 10, 1989

[54] SWIVEL SUPPORT STRUCTURE FOR AN ELECTRIC APPARATUS

[75] Inventors: Takashi Hamada; Teruyuki Hino; Takashi Nodama; Hiroshi Matsuoka, all of Nagaokakyo, Japan

[73] Assignee: Mitsubishi Denki Kabushiki Kaisha, Tokyo, Japan

[21] Appl. No.: 19,118

[22] Filed: Feb. 26, 1987

[30] Foreign Application Priority Data

| Mar. 5, 1986 | [JP] | Japan | 61-32732[U] |
| Mar. 5, 1986 | [JP] | Japan | 61-32733[U] |
| Mar. 5, 1986 | [JP] | Japan | 61-32734[U] |
| Mar. 5, 1986 | [JP] | Japan | 61-32735[U] |
| Mar. 5, 1986 | [JP] | Japan | 61-32736[U] |
| Mar. 5, 1986 | [JP] | Japan | 61-32737[U] |
| Mar. 5, 1986 | [JP] | Japan | 61-32738[U] |
| Mar. 5, 1986 | [JP] | Japan | 61-32739[U] |
| Mar. 5, 1986 | [JP] | Japan | 61-32740[U] |

[51] Int. Cl.$^4$ ............................................. F16M 11/08
[52] U.S. Cl. ............................................. 248/186; 248/542
[58] Field of Search ............... 248/652, 186, 664, 349, 248/131, 425, 289.1, 542; 212/247, 245; 114/8; 89/37.21; 269/57; 108/139, 142; 211/1.5

[56] References Cited

U.S. PATENT DOCUMENTS

| 699,751 | 5/1902 | Fenton | 114/8 |
| 1,358,402 | 11/1920 | Thalhammer | 248/186 X |
| 2,377,448 | 6/1945 | Porter | 212/247 X |
| 2,408,378 | 10/1946 | Davenport | 212/247 |
| 3,056,506 | 10/1962 | Fuller | 211/1.5 |
| 3,982,377 | 9/1976 | Vanderpool | 211/1.5 X |
| 4,446,977 | 5/1984 | McClain | 212/247 |
| 4,547,027 | 10/1985 | Scheibenreif | 248/349 X |
| 4,561,619 | 12/1985 | Robillard | 248/349 X |

FOREIGN PATENT DOCUMENTS 1576666 8/1969 France ................................... 248/1

Primary Examiner—J. Franklin Foss
Attorney, Agent, or Firm—Birch, Stewart, Kolasch & Birch

[57] ABSTRACT

A swivel support structure for supporting an electric apparatus or console such as a television receiver console for angular movement from a neutral position to any one of leftward and rightward positions, which comprises a pedestal having a ring-shaped turntable on which the console is mounted. The turntable has a driven bevel gear formed therewith so as to protrude upwards and is frictionally rotatably mounted on the pedestal. A drive mechanism includes a remote-controlled, electrically operated reversible drive motor and a drive bevel gear drivingly coupled with the drive motor and partially protruding outwardly from the bottom of the console wherefor, when the console is mounted on the pedestal, the driven bevel gear on the turntable is automatically meshed with the drive bevel gear. The console is rotatable relative to the turntable and also to the pedestal.

40 Claims, 13 Drawing Sheets

Fig. 1
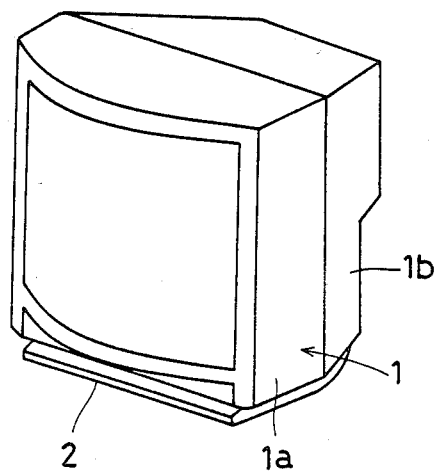
Fig. 2
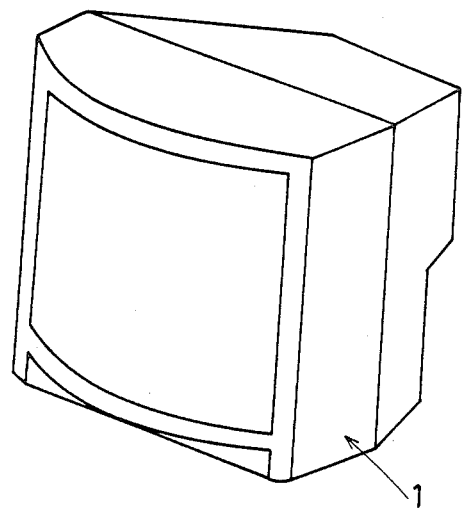
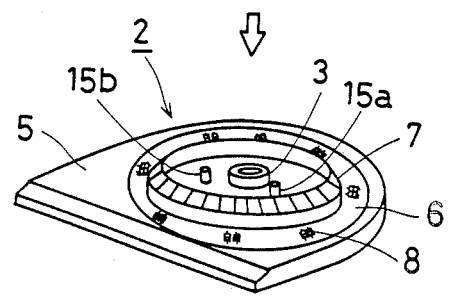

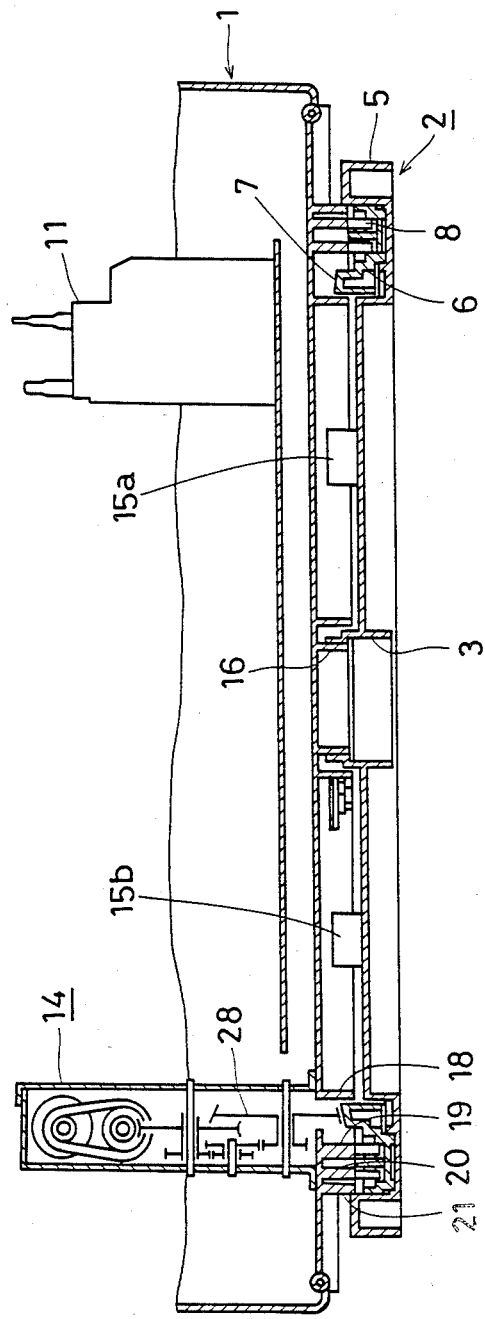

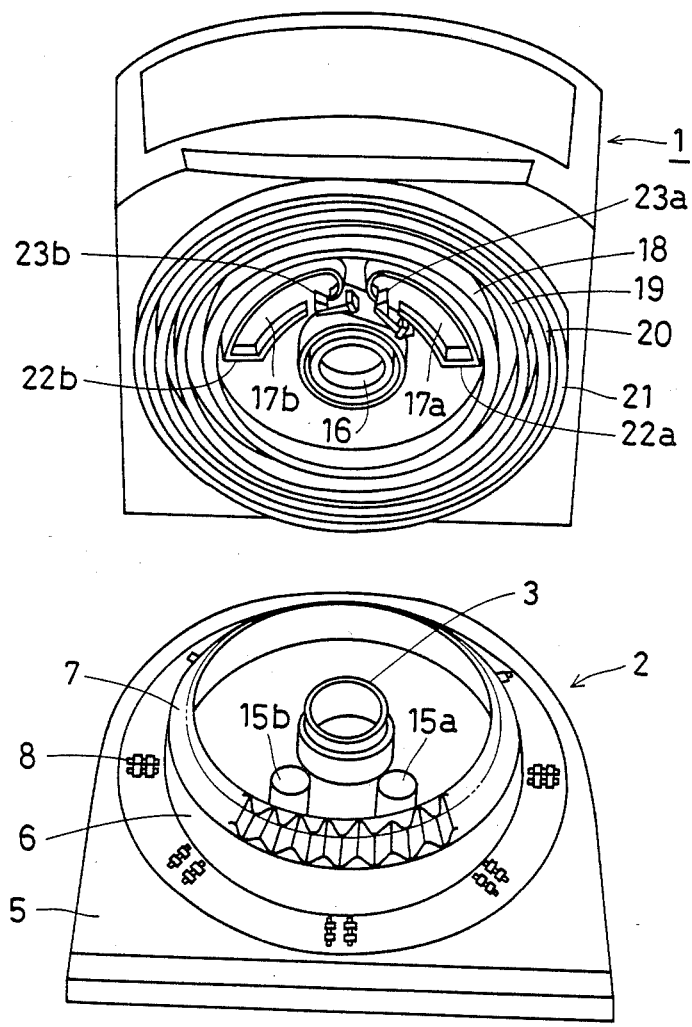

SWIVEL SUPPORT STRUCTURE FOR AN ELECTRIC APPARATUS

BACKGROUND OF THE INVENTION

The present invention generally relates to a swivel support structure for pivotably supporting an electric apparatus such as a television receiver set, a video display, a computer-programmed game display or the like apparatus or console which is desired to be supported for movement leftwards and rightwards and, more particularly, to a remote-controlled, motor-driven swivel support structure.

DESCRIPTION OF THE BACKGROUND ART

A swivel support structure for the support of the television receiver console and designed to turn the television receiver console selectively leftwards and rightwards from a neutral position by the operation of a remote-controlled drive mechanism is not a new development and is, in fact, disclosed in, for example, the Japanese Laid-open Utility Model Publication No. 57-178765, published in 1982, and also the Japanese Laid-open Utility Model Publication No. 60-11565 published Jan. 26, 1985.

The swivel support structure disclosed in the first mentioned publication comprises a pedestal which comprises a stationary base having a bushing formed therein so as to protrude upwardly, a turntable having a bushing formed therein so as to protrude downwardly towards the stationary base, and a connecting shaft having its opposite ends rotatably supported in the respective bushings of the stationary base and the turntable. A plurality of rollers adapted to roll on the upper surface of the stationary base is carried by the turntable by means of respective brackets arranged in a circular row coaxial with and radially outwardly of the connecting shaft. The connecting shaft has its substantially intermediate portion mounted with a spur gear lying in a plane perpendicular to the connecting shaft and having its teeth constantly engaged with a drive worm gear. The drive worm gear is rigidly mounted on a drive shaft of an electrically operated drive motor rigidly mounted on the stationary base.

An annular friction sheet made of rubber material is interposed between an annular end face of the bushing of the turntable and the spur gear on the connecting shaft so that, when the drive motor is operated in response to an external signal issued from a remote control unit with the drive worm gear consequently rotated, the rotational force of the worm gear can be transmitted to the turntable through the spur gear, engaged therewith, and also through the friction sheet to rotate the turntable relative to the stationary base. However, when an external force is manually applied to the television receiver console, the friction sheet can permit slippage between the turntable and the spur gear and, therefore, the turntable can be manually turned relative to the stationary base.

The use of a pair of limit switches for regulating the range over which the television receiver console can be turned leftwards or rightwards from the neutral position is also disclosed. Such limit switches are rigidly mounted on the stationary base and adapted to be selectively actuated by one of the stop pieces rigidly attached to the turntable.

According to the swivel support structure of the first mentioned publication, the turntable is used for supporting a television receiver set and can be turned manually regardless of whether the drive motor is operated or whether it is not operated. However, since the friction sheet made of rubber material is obviously small in size and since the surface area of contact of the friction sheet with the spur gear or the turntable is very small, the friction sheet is likely to wear quickly and cannot exert a frictional force for a prolonged time during which the swivel support structure is actually used. Once the friction sheet wears off, the available drive force cannot be efficiently transmitted from the spur gear to the turntable, causing the turntable to rotate idle relative to the driven spur gear.

The swivel support structure disclosed in the second mentioned publication comprises a drive mechanism built within the television receiver console and a pedestal or stationary base positioned beneath and spaced from the bottom of the television receiver console. More specifically, the bottom of the television receiver console is formed with an annular leg protruding downwardly therefrom. On the other hand, the stationary base is circular in shape and has a circular upright wall protruding upwardly from the periphery thereof to render the stationary base to have a generally U-shaped cross-section, said circular upright wall having an inner diameter substantially equal to the outer diameter of the annular leg so that, when the television receiver console is mounted on the stationary base, the annular leg can be received in the circular upright wall.

The drive mechanism disclosed in the second mentioned publication comprises a remote-controlled drive motor having its drive shaft drivingly coupled with a friction wheel through a reduction gear unit and then through an electromagnetic clutch. While the drive motor, the reduction gear unit and the electromagnetic clutch are housed within the television receiver console, the friction wheel is situated outside the television receiver console and frictionally engaged with the outer peripheral surface of the upright wall integral with the stationary base.

The swivel support structure according to the second mentioned publication has a problem in that, when an external load acting so as to turn the television receiver console is applied to the television receiver console while the drive mechanism is in operation, not only is an excessive load imposed on the drive mechanism through the electromagnetic clutch, but also the friction wheel undergoes an excessive slippage relative to the stationary base, tending to wear quickly. Once this happens, the television receiver console will rotate idle relative to the stationary base.

SUMMARY OF THE INVENTION

The present invention has been devised with a view to substantially eliminating the above discussed disadvantages and inconveniences inherent in the prior art swivel support structure for the support of the console and has for its essential object to provide an improved, remote-controlled swivel support structure which can be utilized for a prolonged period of time without being substantially accompanied by the idle rotation of the console relative to the pedestal.

Another important object of the present invention is to provide an improved swivel support structure of the type referred to above wherein the console can be turned to any desired position manually regardless of whether the remote-controlled drive mechanism is operated or whether it is not operated.

A further object of the present invention is to provide an improved swivel support structure of the type referred to above, wherein the possibility is substantially eliminated of the drive mechanism being excessively loaded which would occur when the console being turned by the drive of the drive mechanism is blocked by any reason.

A still further object of the present invention is to provide an improved swivel support structure of the type referred to above, wherein the console as well as the pedestal can be made of plastics material and wherein the console can be turned with the use of the minimized force.

A yet further object of the present invention is to provide an improved swivel support structure of the type referred to above, wherein the console can be rotated smoothly without accompanying the generation of rattling sounds which would occur when joints formed in the console in the case where the latter is made of plastics material pass over the roller assemblies.

A yet further object of the present invention is to provide an improved swivel support structure of the type referred to above, which can be easily assembled and wherein the drive force necessitated to turn the console can be assuredly transmitted from the drive mechanism to the console.

A yet further object of the present invention is to provide an improved swivel support structure of the type referred to above, wherein the drive mechanism is so positioned that the selective insertion and removal of a cathode ray tube and its associated parts into and from the television receiver console, which would be required during, for example, the servicing of the television receiver set, will not be obstructed by the presence of the drive mechanism and that the drive mechanism will not be adversely affected by an electric discharge which would be induced by a high voltage generating circuit such as a flyback transformer.

A still yet further object of the present invention is to provide an improved swivel support structure of the type referred to above, wherein means is provided for providing an indication to a display viewer or viewers that the drive mechanism is being operated and, hence, the console is being turned.

A still other object of the present invention is to provide an improved swivel support structure of the type referred to above, wherein the possibility of dust and foreign matter entering into a space between the console and the pedestal is substantially eliminated.

A still other object of the present invention is to provide an improved swivel support structure of the type referred to above, which can be manufactured with the use of a minimized number of component parts and wherein the limit switches can readily be fitted to the console in such a way as to facilitate the associated electric wiring job.

According to a preferred embodiment of the present invention herein disclosed, a remote-controlled, motor-driven swivel support structure comprises a television receiver console having incorporated therein various component parts of a television receiver set such as a chassis, a cathode ray tube and a high voltage generating circuit including a flyback transformer, and a pedestal for the support thereon of the television receiver console for angular movement from a neutral position to any one of leftward and rightward positions. The angular movement of the television receiver console can be effected either by the drive mechanism or by the application of a manual turning force.

The pedestal has a generally ring-shaped driven bevel gear provided thereon in concentric relationship with the axis, about which the television receiver console is rotatable, so as to face upwardly. On the other hand, the television receiver console has a drive mechanism including a remote-controlled, electrically operated reversible drive motor and a drive bevel gear drivingly coupled with the drive motor, said drive bevel gear being so positioned as to partially protrude outwardly downwardly from the bottom of the television receiver console for engagement with the driven bevel gear on the pedestal.

In this construction described above, when the television receiver console is mounted on the pedestal from above, the drive bevel gear partially protruding outwardly from the bottom of the television receiver console is automatically engaged with the driven bevel gear on the pedestal. Accordingly, when the reversible drive motor is driven in one of the opposite directions in response to a command generated from a remote control unit, the drive force of the reversible drive motor can be transmitted through the drive bevel gear to the driven bevel gear thereby to rotate the television receiver console relative to the pedestal in one direction from the neutral position towards one of the leftward and rightward directions depending on the direction in which the reversible drive motor is driven.

Preferably, the pedestal includes a stationary base and a ring-shaped turntable having the driven bevel gear formed therein so as to face upwards and has a circular recess defined therein, in which circular recess is frictionally rotatably seated the ring-shaped turntable. In this case, regardless of whether or not the reversible drive motor is operated, and when an external turning force is manually applied to the television receiver console in an attempt to turn the television receiver console leftwards or rightwards, the turntable undergoes a slippage relative to the stationary base thereby permitting the television receiver console to rotate relative to the stationary base. Where the television receiver console is turned by the operation of the drive mechanism, the television receiver console undergoes a rotation relative to the ring-shaped turntable.

Nevertheless, a plurality of roller assemblies are arranged in a circular row concentrical with the axis of rotation of the television receiver console. In one preferred embodiment of the present invention, these roller assemblies are provided on the turntable, but in another preferred embodiment thereof, they are provided on the stationary base, for facilitating the rotation of the television console.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more clearly understood from the following description of preferred embodiments, when taken in conjunction with the accompanying drawings. However, the embodiments and the drawings are given only for the purpose of illustration and explanation only, and are not to be taken as being limitative of the present invention in any way whatsoever, whose scope is to be determined solely by the appended claims. In the drawings, like parts are designated by like reference numerals throughout the several views, and:

FIG. 1 is a schematic perspective view of a television receiver set embodying the present invention;

FIG. 2 is an exploded view showing a swivel support structure separated from the bottom of the television receiver set;

FIG. 5 is a partial sectional view of the swivel support structure according to the present invention;

FIG. 6 is a perspective view illustrating the bottom of the television receiver console and the swivel support structure both as viewed from front;

FIG. 7 illustrates the details of the drive mechanism for the swivel support structure, wherein

FIG. 10 illustrates both the arrangement of a limit switch support and the relationship in position between roller assemblies and associated skirts, wherein

DETAILED DESCRIPTION OF THE PREFERRED EMBODIMENTS

According to a broad aspect of the present invention, a swivel support structure referred to hereinbefore and hereinafter and constructed according to the present invention comprises a generally box-like container or housing, a pedestal on which the box-like container or housing is mounted for rotation about an axis perpendicular to the pedestal, and a drive mechanism for driving the box-like container or housing relative to the pedestal. However, for the purpose of the description of the preferred embodiments of the present invention, reference is made to a television receiver set of which console constitutes the box-like housing referred to above and is rotatably mounted on the pedestal forming a substantial base for the television receiver console.

Figure 3:
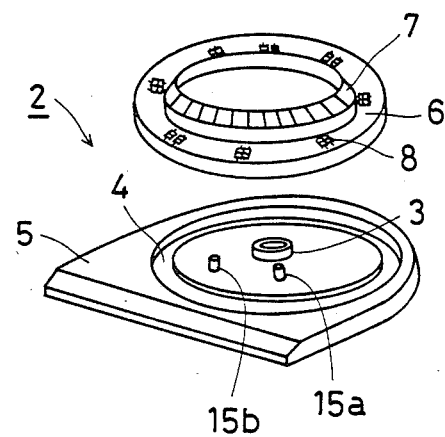
FIG. 3 is an exploded view of the swivel support structure according to the present invention.
Figure 4:
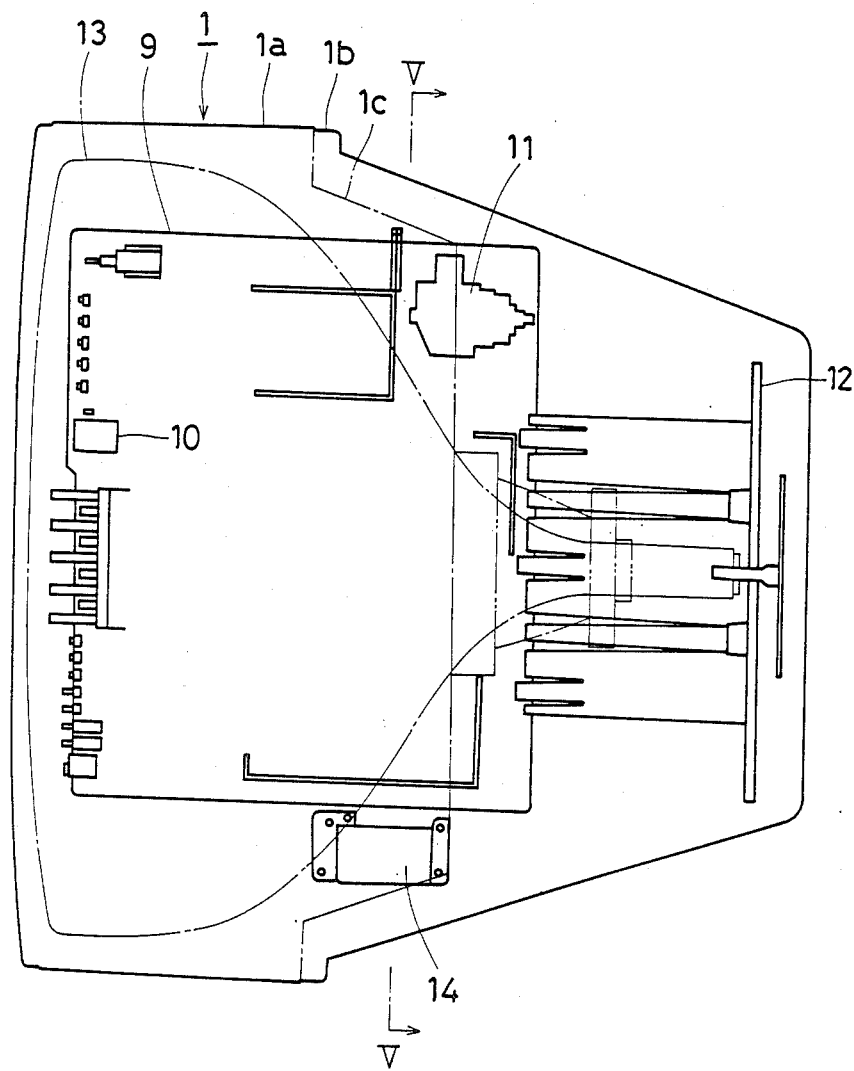
FIG. 4 is a schematic diagram showing the layout of various components of the television receiver set within a console shown in relation to a drive mechanism for the swivel support structure as viewed from top.

Referring now to FIGS. 1 to 11 and, particularly, to FIG. 1, the television receiver console, generally identified by 1, is comprised of front and rear console portions 1a and 1b. The front console portion 1a is of a generally rectangular front shape as viewed from front and, as shown in FIG. 4, contains a cathode ray tube 13 therein. The front console portion 1a has a rear opening from which the neck of the cathode ray tube 13 protrudes outwardly, which rear opening is covered by the rear console portion 1b with the outwardly protruding neck of the cathode ray tube 13 situated inside the rear console portion 1b. The front and rear console portions 1a and 1b are connected together in any known manner to provide a complete television receiver console 1 of generally rectangular box-like configuration.

As best shown in FIG. 2, the pedestal generally identified by 2 and made of synthetic resin so rigid enough to support a substantial weight of the television receiver set is positioned below the bottom of the television receiver console 1 and comprises a stationary base 4 and a generally ring-shaped turntable 6 freely rotatably mounted on the stationary base 5 in a manner as will be described subsequently. As shown in FIG. 3, the stationary base 5 has an upright stud shaft 3 formed integrally with, or otherwise rigidly mounted on, the stationary base 5 so as to protrude at right angles thereto; a pair of stopper pins 15a and 15b formed integrally with, or otherwise rigidly mounted on, the stationary base 5 and spaced a predetermined angular distance from each other about the upright stud shaft 3 and also an equal distance from the upright stud shaft 3; and a circular recess 4 defined in the stationary base 5 in concentrical relationship with the upright stud shaft 3.

The ring-shaped turntable 6 is seated within the circular recess 4 in the stationary base 5 and is freely rotatable about the upright stud shaft 3 in any one of the opposite directions. This turntable 6 is integrally formed with, or rigidly mounted with, a ring-shaped bevel gear 7 concentric therewith and having its gear teeth oriented diagonally upwardly and generally radially outwardly of the turntable 6. The outer diameter of the bevel gear 7 is so smaller than the outer diameter of the turntable 6 as to define an outer peripheral margine in which a plurality of circumferentially equally spaced sockets are defined in a circular row coaxial therewith for accommodating respective roller assemblies 8.

Each of the roller assemblies 8 comprises a pair of support shafts extending parallel to each other in a direction radially of the turntable 6 and spaced a distance from each other in a direction circumferentially of the turntable 6, and a pair of rollers for each support shaft, said pair of rollers being rotatably mounted on the respective support shaft and spaced a distance from each other in a direction radially of the turntable 6.

FIG. 4 illustrates the layout, as viewed from top of the television receiver set, of various components of the telvision receiver set that are housed within the television receiver console 1, FIG. 5 is a cross-sectional representation of a bottom region of the television receiver console 1 and the pedsetal 2 substantially taken along the line V—V in FIG. 4, and FIG. 6 is a perspective view showing the bottom of the television receiver console 1 and the pedestal 2. Referring now to FIG. 4, within the television receiver console 1, there is disposed a generally rectangular chassis 9 supported on the bottom of the television receiver console 1, a photoelectric sensor unit 10 forming a part of a drive control, as will be described later, and mounted atop the chassis 9 at a position generally beneath the faceplate of the cathode ray tube 13, and a flyback transformer 11 mounted atop the chassis 9 at a position adjacent one of the opposite rear corners thereof. As hereinbefore described, the television receiver console 1 made of any suitable plastics material is comprised of the front and rear console portions 1a and 1b, the line of separation between these front and rear console portions 1a and 1b being identified by 1c. It is to be noted that, when the rear console portion 1b is separated from the front console portion 1a, the chassis 9 can be withdrawn out of the front console portion 1a for the removal of the chassis 9 with the various components thereon out of the television receiver console 1 which will be necessitated during, for example, the servicing of the television receiver set.

Accommodated within the front console portion 1a is, in addition to the cathode ray tube 13 described hereinbefore, a drive mechanism 14 for driving the television receiver console 1 relative to the pedestal 2 about the upright stud shaft 3 as will be described later. The drive mechanism 14 is so positioned at a location furthest from the flyback transformer 11 and laterally of the chassis 9 that the presence of the drive mechanism 14 will not provide an obstruction to the selective insertion and removal of the chassis 9 into and out from the front console portion 1a. A terminal carrier plate 12 having antenna terminals and some other required terminals is supported in position inside the rear console portion 1b.

As best shown in FIGS. 5 and 6, the bottom of the television receiver console 1 is formed integrally with a circular bearing wall 16 protruding downwards as viewed in FIG. 5 and adapted to receive the upright stud shaft 3 on the stationary base 5 when the television receiver console 1 is mounted on the stationary base 5. Thus, it will readily be seen that the television receiver console 1 is rotatable about the upright stud shaft 3. However, by the reason which will become clear from the subsequent description, the angle through which the television receiver console 1 can be rotated in any one of the opposite directions, i.e., leftwards and rightwards, from a neutral position about the upright stud shaft 3 is limited to a predetermined value, for example, about 45° although it may be smaller or greater than about 45°.

Figure 9A:
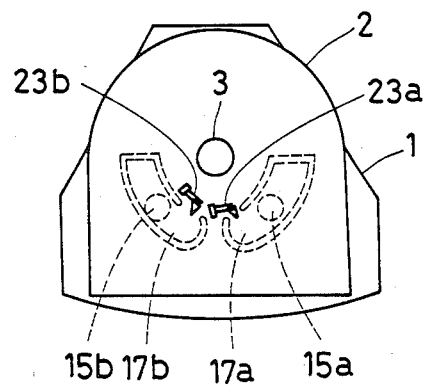
FIGS. 9(a) to 9(c) are schematic diagrams used to explain the operation of a stop mechanism used in the swivel support structure according to the present invention.

The bottom of the television receiver console 1 is also formed integrally with a pair of generally arcuate groove-defining walls 22a and 22b protruding downwards as viewed in FIG. 6 and so positioned as to occupy respective portions of the imaginary circle concentric with the circular bearing wall 16. Each of these groove-defining walls 22a and 22b extends a predetermined angle, for example, about 90°, about the center of the circular shape of the bearing wall 16 and has a respective arcuate guide groove 17a or 17b defined therein. The stopper pins 15a and 15b formed on the stationary base 5 as hereinbefore described and spaced from each other a predetermined angle, for example, about 90°, about the upright stud shaft 3 are, when and so long as the television receiver console 1 is mounted on the pedestal 2, movably engaged in the respective arcuate guide grooves 17a and 17b. Thus, it will readily be seen that, during the rotation of the television receiver console 1 relative to the pedestal 2, that is, any one of the stationary base 5 and the turntable 6, the stopper pins 15a and 15b relatively move and are relatively guided within the guide grooves 17a and 17b, respectively, but when and so long as the television receiver console 1 is held in the neutral position, the stopper pins 15a and 15b are positioned intermediately of the respective lengths of the guide grooves 17a and 17b as shown in FIG. 9(a).

As shown in FIG. 6, the bottom of the television receiver console 1 is yet formed integrally with four circular skirts 18, 19, 20 and 21 coaxial with each other and also with the circular bearing wall 16. The circular skirts 18 and 19 are so spaced as to define an annular space for accomodating therein the bevel gear 7 (FIG. 5) fast with the ring-shaped turntable 6 when and so long as the television receiver console 1 is mounted on the pedestal 2. As will become clear from the subsequent description, a drive bevel gear 28 (FIGS. 7 and 10) forming a part of the drive mechanism 14 accommodated within the television receiver console 1 is partially exposed to the outside of the television receiver console 1 through an opening, defined in that portion of the bottom of the television receiver console 1 which is delimited between the circular skirts 18 and 19, for engagement with the bevel gear 7. Referring to FIG. 5, preferably, the outer diameter of the skirt 18 and the inner diameter of the skirt 19 are so selected as to be generally equal to the inner diameter of the bevel gear 7 (and, hence, the inner diameter of the ring-shaped turntable 6) and the outer diameter of the same bevel gear 7, respectively, wherefore the relative displacement of one of the bevel gears 7 and 28 then meshed with each other from the other of the bevel gears 7 and 28 will not take place in a direction radially of the turntable 6.

The circular skirt 19 serves not only to define the annular space for accommodating the bevel gear 7 in cooperation with the circular skirt 18, but also to support a portion of the total weight of the television receiver set from below. More specifically, when so long as the television receiver console 1 is mounted on the pedestal 2, the circular skirts 19 and 20 have its annular free end faces opposite to the bottom of the television receiver console 1 resting respectively on inner and outer circular rows of the rollers of all of the roller assemblies 8 carried by the turntable 6. In other words, the free end faces of the respective circular skirts 19 and 20 serve as rails along which the inner and outer rows of the rollers of the rollers assemblies 8 are guided. In this way, the substantially total weight of the television receiver set is supported by the paired rollers of all of the roller assemblies 8 on which it rests through the circular skirts 19 and 20, while the roller assemblies 8 permit the television receiver console 1 to be rotated relative to the turntable 6 by the application of a relatively small driving force, small for a given weight of the television receiver set.

It is to be noted that, although in the instance now under discussion the circular skirts 19 and 20 have been shown and described as spaced from each other in a radial direction, a single circular skirt having a substantial wall thickness enough to span over each pair of the rollers of each roller assembly 8 can be employed in place of the separate circular skirts 19 and 20. It is also to be noted that the circular skirt 18 which is located radially innermost of all of the skirts can be dispensed with if desired.

The circular skirt 21 which is located radially outermost of all of the skirts has its inner diameter enough to cover the turntable 6 and serves as a dust preventive apron effective to substantially prevent dusts and foreign matter from entering the inside of the circular skirt 21.

As shown in FIG. 6, the bottom of the television receiver console 1 has a pair of limit switches 23a and 23b fitted thereto through a common switch carrier plate 33 in a manner as will be described later with reference to Fig. 10(a). These limit switches 23a and 23b are of normally open switches and have respective actuators engageable with the associated stopper pins 15a and 15b. The switch carrier plate 33 (FIG. 10(a)) carrying the limit switches 23a and 23b is fitted to the bottom of the television receiver console 1 with the actuators of the respective limit switches 23a and 23b protruding through cutouts, defined respectively in the groove-defining walls 22a and 22b, into the associated guide grooves 17a and 17b for engagement with the associated stopper pins 15a and 15b one at a time. More specifically, as best shown in FIG. 9(a), when and so long as the television receiver console 1 is held in the neutral position at which the faceplate of the cathode ray tube 13 or the screen of the television receiver set is oriented frontwards towards one or more viewers, the stopper pins 15a and 15b are positioned intermediate of the respective lengths of the guide grooves 17a and 17b without engaging the actuators of the limit switches 13a and 13b.

Figure 9B:
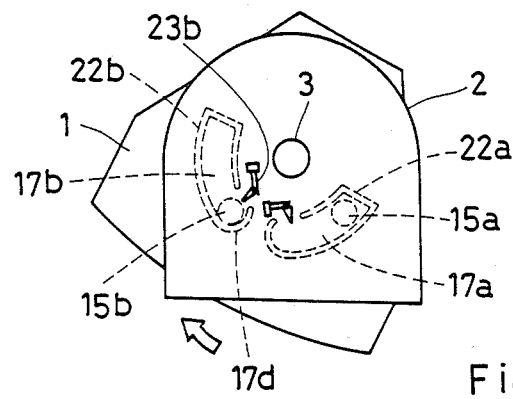
Figure 9C:
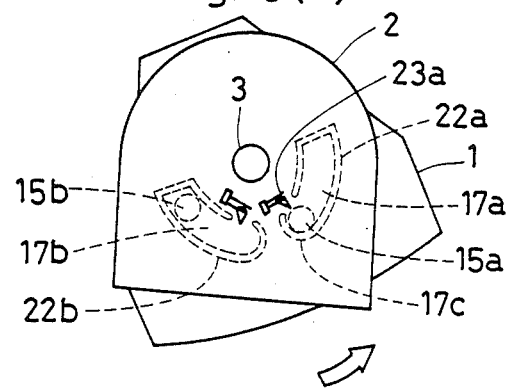

However, when the television receiver console 1 is swung rightwards, as viewed from the position of the viewers, relative to the turntable 6 from the neutral position to the rightward position as shown in FIG. 9(b), it being to be noted that FIG. 9(b) as well as FIGS. 9(a) and 9(c) are representations of the television receiver set as viewed from bottom, the stopper pin 15a is brought to one end of the guide groove 17a remote from the guide groove 17b whereas the stopper pin 15b is brought to one end of the guide groove 17b adjacent the guide groove 17a. As the stopper pin 15b relatively approaches such one end of the guide groove 17b, the actuator of the associated limit switch 23b is engaged with the stopper pin 15b so that only the limit switch 23b is switched on in response to the arrival of the stopper pin 15b at such one end of the guide groove 17b, that is, in response to the arrival of the television receiver console 1 at the rightward position.

On the other hand, when the television receiver console 1 is swung leftwards relative to the turntable 6 from the neutral position to the leftward position as shown in FIG. 9(c), the relative movement of the stopper pins 15a and 15b in a manner reverse to that described above takes place with the consequence that only the limit switch 23a is switched on in response to the arrival of the stopper pin 15a at such one end of the guide groove 17a, that is, in response to the arrival of the television receiver console 1 at the leftward position.

Figure 7A:
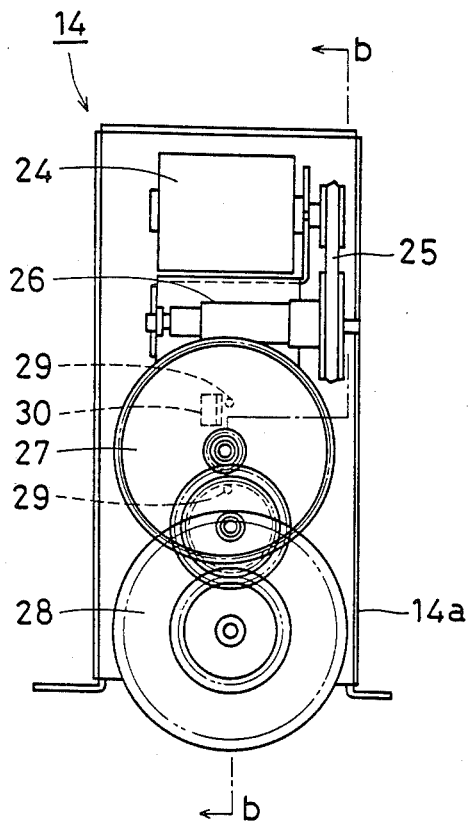
Fig. 7(a) is a sectional view as viewed in a direction shown by a—a in FIG. 7(b) and FIG. 7(b) is a cross-sectional view taken along the line b—b in FIG. 7(a)
Figure 7B:
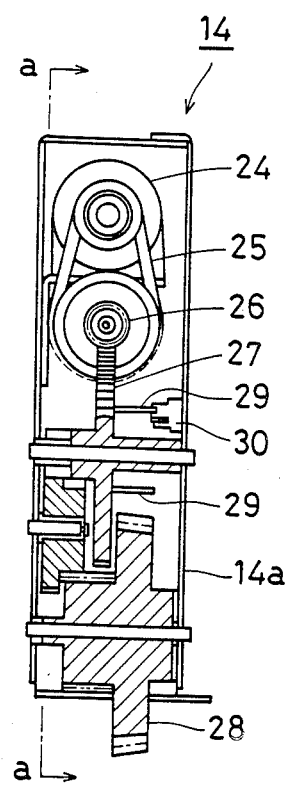

Referring particularly to FIGS. 7(a) and 7(b) illustrating the details of the drive mechanism 14, the drive mechanism 14 comprises an electrically operated reversible motor 24 mounted on a support framework 14a mounted on the chassis 9 (See FIG. 4), a worm gear 26 rotatably supported by the support framework 14a and drivingly coupled with the motor 24 by means of a drive transmission member such as, for example, an endless belt 25, and a spur gear 27 also rotatably carried by the support framework 14a and constantly meshed with the worm gear 26. The spur gear 27 has a hub formed as an externally geared hub which is constantly meshed with an externally geared hub of the drive bevel gear 28 through an intermediate gear. In any event, all of the endless belt 25, the worm gear 26, the spur gear 27 and the intermediate gear altogether constitute a drive transmission system for transmitting a driving force from the motor 24 to the drive bevel gear 28.

Figure 10A:
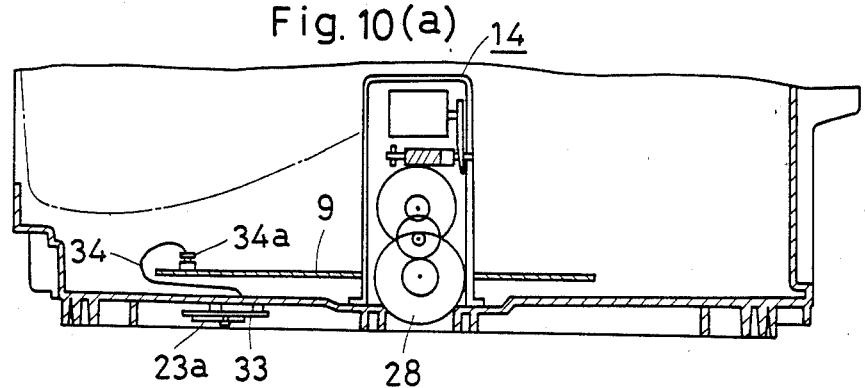
FIG. 10(a) is a side sectional view of a bottom portion of the television receiver console and FIG. 10(b) is a bottom plan view of the bottom portion of the television receiver console.
Figure 10B:
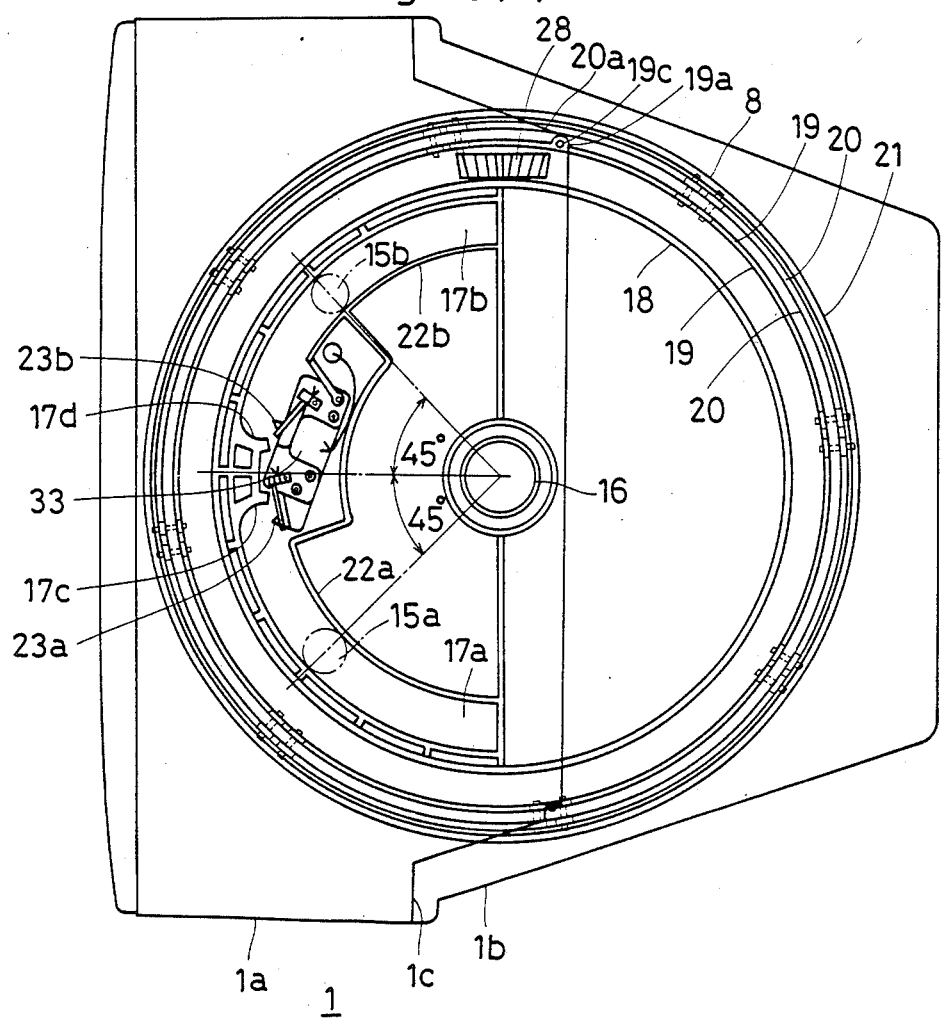
Figure 11A:
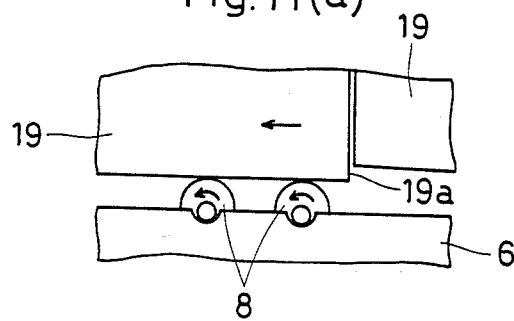
FIGS. 11(a) to 11(d) are schematic side views showing the sequence of operation of the roller assemblies during the rotation of the television receiver console relative to the swivel support structure.
Figure 11B:
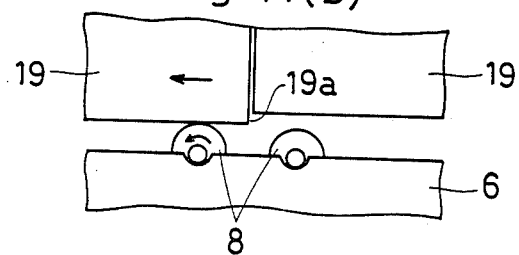
Figure 11C:
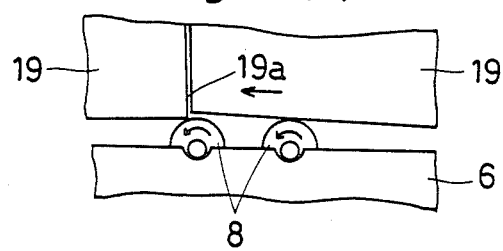
Figure 11D:
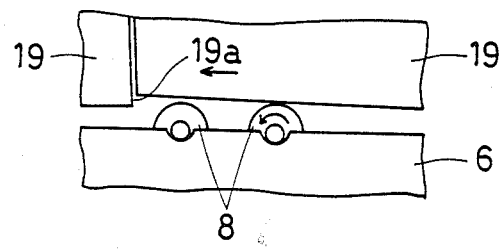
Figure 12:
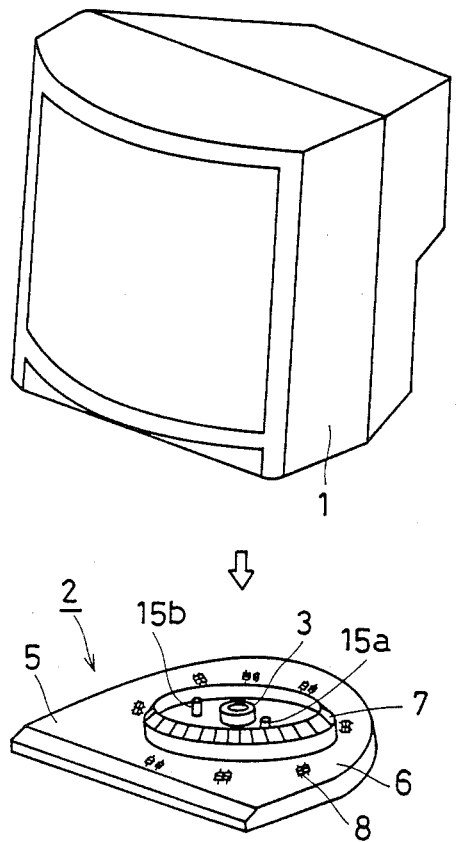
FIG. 12 is a view similar to FIG. 2, showing another preferred embodiment of the present invention.
Figure 13:
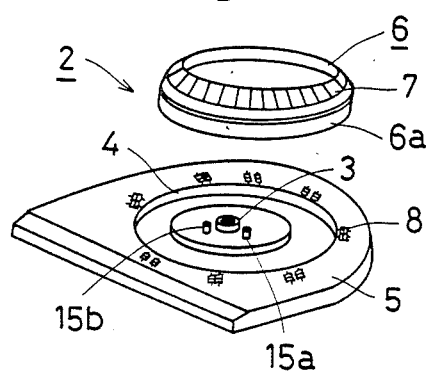
FIG. 13 is a view similar to FIG. 3, showing the swivel support structure according to such another preferred embodiment of the present invention.
Figure 14:
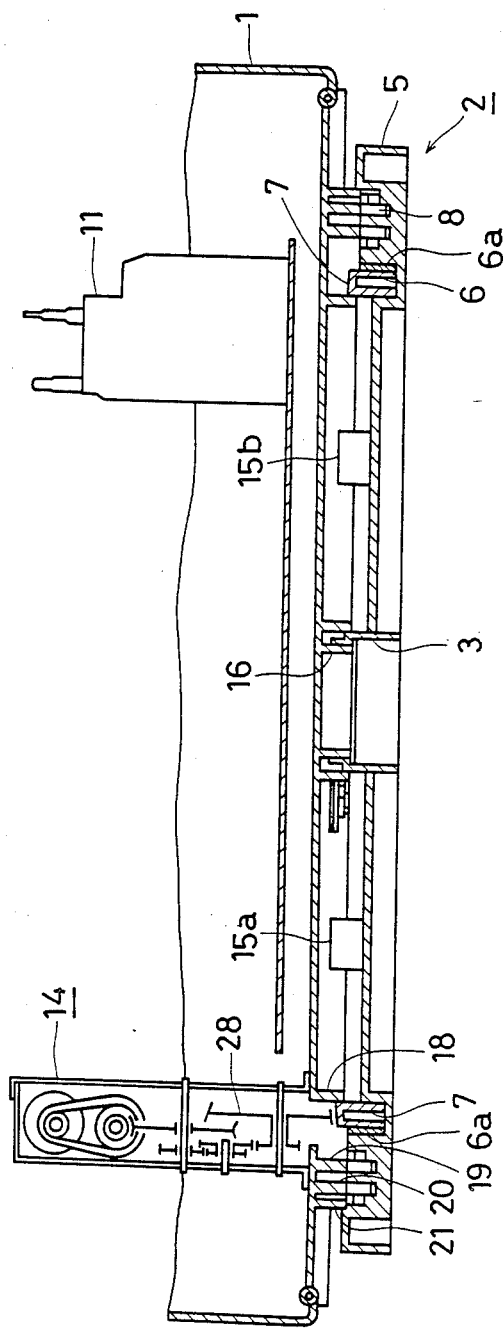
FIGS. 14 and 15 are views similar to FIGS. 5 and 6, respectively, showing the swivel support structure according to such another preferred embodiment of the present invention.
Figure 15:
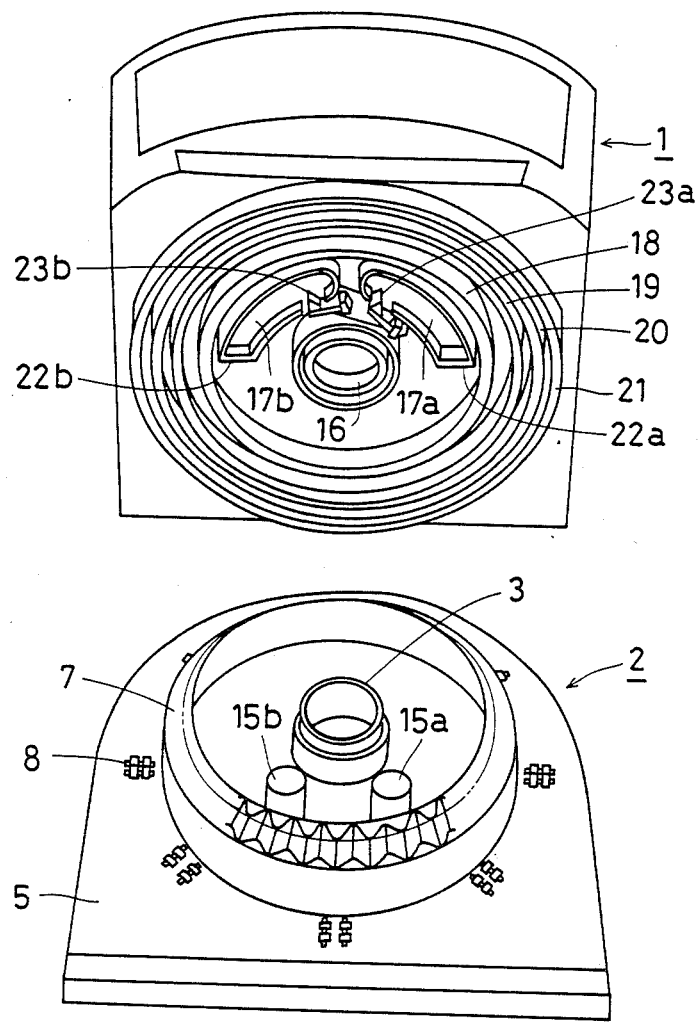

The support framework 14a carrying all of the drive motor 24, the worm gear 26, the spur gear 27, the intermediate gear and the drive bevel gear 28 is mounted on the chassis 9 inside the television receiver console 1 with the bevel-geared outer peripheral portion of the drive bevel gear 28 partially protruding outwards from the bottom of the television receiver console 1 as best shown in Figs. 10(a) and 10(b) for engagement with the bevel gear 7 fast with the turntable 6. Therefore, it is clear that, when the reversible motor 24 is driven in any one of the opposite directions, the drive bevel gear 28 is rotated with its rotation transmitted to the turntable 6 through the bevel gear 7 fast therewith, causing the television receiver console 1 as a whole to rotate relative to the turntable 6 about the longitudinal axis of the upright stud shaft 3.

It is to be noted that, if the television receiver console 1 is held stationary relative to the stationary base 5, the rotation of the drive motor 24 and, hence, that of the drive bevel gear 28 results in the rotation of the turntable 6 relative to both of the television receiver console 1 and the stationary base 5 because of the fact that the turntable 6 is received in the circular recess 4 defined in the stationary base 5 as hereinbefore described. This design brings about such an advantage as will become clear from the subsequent description. However, in practice, the rotation of the drive bevel gear 28 does not bring about the rotation of the turntable 6 relative to the stationary base 5 because the turntable 6 seated in the circular recess 4 in the stationary base 5 is loaded by the total weight of the television receiver set and, hence, held under frictional contact therewith.

Figure 8:
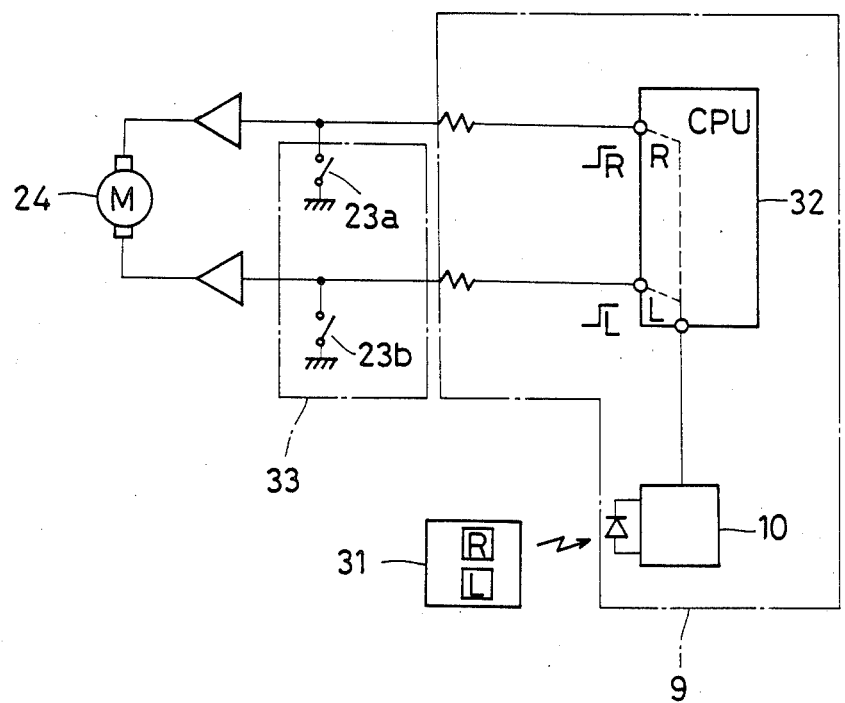
FIG. 8 is a circuit diagram showing a drive control for controlling a drive motor of the drive mechanism.

FIG. 8 illustrates schematically a drive control circuit for controlling the operation of the drive motor 24. The drive control circuit 9 makes use of a central processing unit 32 comprised of a microcomputer and adapted to receive an intelligence signal issued from the photoelectric sensor unit 10. The generation of the intelligence signal from the photoelectric sensor unit 10 takes place when a photocell used in the photoelectric sensor unit 10 receives a beam of infrared light emitted from a remote control unit 31. More specifically, the remote control unit 31 has, among other buttons, two direction selecting buttons marked"L"and"R', respectively, representative of the rightward and leftward turns of the television receiver console 1 and can emit one of the two different infrared beams depending on which one of the"R' and"L"buttons has been depressed. Correspondingly, the intelligence signal generated from the photoelectric sensor unit 10 to the central processing unit 32 conveys the information descriptive of the direction of turn of the television receiver console 1 selected upon the depression of one of the"R" and"L" buttons in the remote control unit 31. The central processing unit 32 is, in the instance as shown, so programmed that, when in consideration of the intelligence delivered from the photoelectric sensor unit 10 the central processing unit 32 determines that the television receiver console 1 should be turned leftwards, the central processing unit 32 applies a drive voltage to the drive motor 24 for driving the latter in one of the opposite directions until the limit switch 23a is turned on in the manner as hereinbefore described, but when in consideration of the intelligence delivered from the photoelectric sensor unit 10 the central processing unit 32 determines that the television receiver console 1 should be turned rightwards, it applies a drive voltage to the drive motor 24 for driving the latter in the other of the opposite directions until the limit switch 23b is turned on in the manner as hereinbefore described.

It is to be noted that the remote control unit 31 may be of a type capable of generating either a wireless signal or an ultrasonic signal, in which case the photoelectric unit 10 should be replaced with a wireless receiver or an ultrasonic wave receiver. It is also to be noted that those skilled in the art can readily devise an electric control circuit which does not make use of the central processing unit such as shown in and described with reference to FIG. 8.

The switch carrier plate 33 having the limit switches 23a and 23b rigidly mounted thereon in spaced relationship with each other is, as hereinbefore described, fitted to the bottom of the television receiver console 1. This is best shown in FIGS. 10(a) and 10(b). As shown therein, electric wiring led out from these limit switches 23a and 23b are bundled into a cable 34 having its free end provided with a connector 34a, which connector 34a is in turn releasably coupled with a mating connector rigidly mounted on the chassis 9.

In the construction so far described, while the circular turntable shown in FIG. 6 is seated in the circular recess 4 in the stationary base 5 in coaxial relationship with the upright and stud shaft 3 with the bevel gear 7 facing diagonally upwards, the television receiver console 1 when it is to be mounted on the pedestal 2 should be mounted on the stationary base 5 from above so that, when the television receiver console 1 is completely mounted thereon, the stopper pins 15a and 15b on the stationary base 5 can be loosely engaged within the arcuate guide groove 17a and 17b while the annular end faces of the respective skirts 19 and 20 opposite to the bottom of the television receiver console 1 can rest on the rollers of each pair of the roller assemblies 8. In this mounted condition as shown in FIG. 5, the innermost skirt 18 is positioned radially inwardly of the circular turntable 6 while the bevel gear 7 is permitted to protrude into an annular shape, delimited between the innermost and next adjacent skirts 18 and 19, for driving engagement with the drive bevel gear 28 of the drive mechanism 14.

Let it be assumed again that the television receiver console 1 on the pedestal 2 is held at the neutral position intermediate of the angular distance between the leftward and rightward positions as shown in FIG. 9(b). If a television viewer wishes to turn the television receiver console 1 rightwards, what he or she should do is to push the "R" button on the remote control unit 31 to cause the drive motor 24 to rotate in one of the opposite directions, for example, in the first direction. The drive force of the drive motor 24 is then transmitted to the drive bevel gear 28 through the drive transmission system, causing the television receiver console 1 to swing rightwards about the upright stud shaft 3 relative to the turntable 6.

At the time the television receiver console 1 so swung rightwards arrives at the rightward position, the stopper pin 15b relatively moving within the guide groove 17b is, as shown in FIG. 9(b), brought into contact with a portion 17d of the groove-defining wall 22b closest to the groove-defining wall 22a and, at this time, the stopper pin 15b may or may not be brought into contact with a portion of the groove-defining wall 22a. However, shortly before the abutment of the stopper pin 15b with that portion 17d of the groove-defining wall 22b, the limit switch 23b is closed by the engagement of its actuator with the stopper pin 15b and, therefore, the driver motor 24 then driven in the first direction is brought to a halt.

On the other hand, where the "L" button of the remote control unit 31 is pushed regardless of whether the television receiver console 1 is in the neutral position or whether it is in the rightward position, the drive motor 24 is driven in the other of the opposite directions, that is, in the second direction, and the television receiver console 1 is swung leftwards in a similar manner as described above, but in the opposite direction, about the upright stud shaft 3 relative to the turntable 6 until the stopper pin 15a being relatively moved within the guide groove 17a is, as shown in FIG. 9(c), brought into engagement with a portion 17c of the groove-defining wall 22a adjacent the groove-defining wall 22b. However, shortly before the stopper pin 15a is brought into abutment with that portion 17c of the groove-defining wall 22a, the limit swtich 23a is closed by the engagement of the actuator thereof with the stopper pin 15a and, therefore, the drive motor 24 then driven in the second direction is brought to a halt.

In either case, the angle through which the television viewer actually wishes to turn the television receiver console 1 within the available range of angle over which the television receiver console 1 can be moved rightwards can be selected substantially at the instant the external pushing force applied to the "R" button of the remote control unit 31 (FIG. 8) is released. In other words, when the television viewer ceases the application of the external pushing force to either of the "R" and "L" buttons of the remote control unit 31 while the television receiver console 1 is being swung in either direction towards the leftward or rightward position, the television receiver console 1 can be brought to a halt at such a position as determined by the timing at which such application of the external pushing force is interrupted.

It is, however, preferred that each of the limit switches 23a and 23b is so positioned as to be activated when the television receiver console 1 is swung about 40° about the upright stud shaft 3 leftwards or rightwards, in order to avoid any possible abrupt collison of the associated stopper pin 15a or 15b with that portion 17c or 17d of the groove-defining wall 22a or 22b.

In order for the television viewer to be informed of the leftward or rightward movement of the television receiver console 1 actually taking place, a crackling sound generator is utilized, which comprises, as best shown in FIG. 7(a) and 7(b), a plectrum member in the form of a pin 29 rigidly secured to, or otherwise integrally formed with, the spur gear 27 so as to protrude laterally outwardly therefrom, and a sound generating piece in the form of a leaf spring member 30 rigidly secured to the framework 14a so as to project into the path of movement of the pin 29. During each complete rotation of the spur gear 27 as a result of the rotation of the drive motor 24, the pin 29 is brought into engagement with the leaf spring member 30 causing the latter to warp against its resiliency and allow the leaf spring member 30 to snap back to the original shape. In this way, the leaf spring member 30 generates a crackling sound each time the pin 29 is moved past the leaf spring member 30 in engagement therewith, which crackling sound is audible to the television viewer indicating that the television receiver console 1 is being turned.

Instead of the employment of the crackling sound generator, a music generator may be employed which can be accomplished by the utilization of a plurality of pins secured to the spur gear 27 so that, when the pins on the spur gear 27 are brought into engagement with one or more pins secured to the framework 14a, rhythmical sounds can be generated. Alternatively, in place of such a mechanical sound generator, an electric sound synthesizer including a loudspeaker may be employed. Where the electric sound synthesizer is used, an electric switch and an actuator should be mounted on the framework 14a and the spur gear 27 so that, when the switch is actuated by the actuator, the electric sound synthesizer can be activated to produce synthesized sounds through the loudspeaker. For this purpose, the central processing unit shown in and described with reference to FIG. 8 may be utilized for receiving a signal from the switch and for commanding the electric sound synthesizer.

It is to be noted that, in the foregoing embodiment, during the rotation of the drive bevel gear 28, shown in FIG. 5, as a result of the rotation of the drive motor 24, the television receiver console 1 is rotated about the upright stud shaft 3 relative to the turntable 6. Although it seems that the rotation of the drive bevel gear 28 would result in the rotation of the turntable 6 relative to the stationary base 5, and no rotation of the television receiver console 1, but this does not occur. This is because the turntable 6 seated within the circular recess 4 in the stationary base 5 is held under friction with the stationary base 5, a coefficient of friction between the turntable 6 and the stationary base 5 being great enough to permit the television receiver console 1 to rotate relative to the stationary base 5 while the turntable 6 remains stationary in the circular recess 4, as the television receiver console 1 rests on the rollers of the roller assemblies 8 in the turntable 6, giving fairly tight frictional contact between the turntable 6 and the stationary base 5 by the weight of the television set. More specifically, the friction in the system between the television receiver console 1 and the roller assemblies 8 is smaller than the friction in the system between the turntable 6 and the stationary base 5.

In view of the foregoing, the television receiver console 1 can be brought to any desired position between the neutral position and the leftward or rightward position even when the drive motor 24 is not electrically energized, that is, held inoperative. This can be accomplished when the television viewer applies an external pushing force to the television receiver console 1 so as to manually turn the latter leftwards or rightwards about the upright stud shaft 3. In this case, the manually applied turning force is transmitted to the turntable 6 through the bevel gears 7 and 28 then stationarily engaged with each other. The manually effected turn of the television receiver console 1 is accompanied by the corresponding rotation of the turntable 6 relative to the stationary base 5 while the turntable 6 undergoes a slippage relative to the stationary base 5. In practice, this manual turn of the television receiver console 1 can be effected even when the drive motor 24 is electrically energized and therefore in operation, in which case both of the relative slippage between the turntable 6 and the stationary base 5 and the rotation of the television receiver console 1 relative to the turntable 6 would occur substantially simultaneously.

The capability of the turntable 6 being rotatable relative not only to the television receiver console 1, but also to the stationary base 5 is advantageous in the case where an external force is excessively applied to, or acts on, the television receiver console 1 by a playing baby in a direction counter to the direction in which the television receiver console 1 is being motor-driven. In this case, no force greater than the force of friction which would occur between the turntable 6 and the stationary base 5 act against the relative rotation between the drive and driven bevel gears 28 and 7, and therefore, there is no possibility that the teeth of one or both of the driven and drive bevel gears 7 and 28 may be broken.

The television receiver console 1 has been described as comprised of the front and rear console portions 1a and 1b separated by the line of separation 1c. Accordingly, in practice, each of the skirts 18 to 21 is comprised of two generally semi-circular skirt segments integral or face with that respective bottom portions of the front and rear console portions 1a and 1b which altogether form the bottom of the television receiver console 1. Because of this, when the front and rear console portions 1a and 1b are assembled together to provide the complete television receiver console 1, joints are formed between the two semi-circular skirt segments of each of the skirts 18 to 21.

In the practice of the present invention, as best shown in FIG. 10(a), the line of separation 1c is so selected and so positioned that joints between the semicircular skirt segments of at least two skirts 19 and 20 can be displaced in position from each other in a direction circumferentially of the skirts 19 and 20 as shown by 19a and 20a. Therefore, considering the relationship between each roller assembly 8 and the adjacent joints between the semi-circular skirt segments of the skirts 19 and 20 as shown in FIG. 11, when one joint, for example, the joint 19a in the skirt 19, is brought into register with and above one of the circumferentially spaced rollers of such roller assembly 8 during the rotation of the television receiver console 1 relative to the turntable 6, the joint 20a in the skirt 20 (FIG. 10(a)) is offset from the other of such circumferentially spaced rollers of such roller assembly 8. It does not occur that each neighboring joints 19a and 20a between the semi-circular skirt segments of the respective skirts 19 and 20 may be brought in register with and immediately above the paired, radially spaced rollers of the associated roller asembly 8.

The above described arrangement is advantageous in that, even though at each joint between the semicircular skirt segments of one or both of the skirts 19 and 20 the semi-circular skirt segments are indented relative to each other as shown in FIG. 11, the television receiver console 1 can be rotated smoothly relative to the turntable 6 without substantially being tripped and without being substantially accompanied by the generation of rattling sounds. FIGS. 11(a) to 11(d) illustrate in sequence, how the joint 19a moves over the circumferentially spaced rollers of the roller assembly 8 as the television receiver console 1 is rotated relative to the turntable 6 in a direction shown by the arrow. It is to be noted that a similar description can apply even where the annular end face of one or both of the skirts 19 and 20 is formed with any other indentations such as, for example, markings 19c which were left by knock-out pins during the plastics molding used to mold the television receiver console 1 or screw holes in which screws or the like are inserted.

In the foregoing embodiment shown in and described with reference to FIGS. 1 to 11, the stopper pins 15a and 15b have been shown and described as formed on the stationary base 5 at respective locations radially inwardly of the circular recess 4 in the stationary base 5. However, the stopper pins 15a and 15b may be integrally formed with the turntable 6 if the latter has a radially inwardly protruding flange for accommodating such stopper pins 15a and 15b.

If it is desired to lessen the manually applied turning force necessary to turn the television receiver console 1, additional rollers may be interposed between the bottom of the recess 4 in the stationary base 5 and the turntable 6, in which case the friction between such additional rollers and the television receiver console 1 is to be greater than that between the television receiver console 1 and the roller assemblies 8.

FIGS. 12 to 15 illustrate another preferred embodiment of the present invention, wherein the turntable 6 itself is constituted by the driven bevel gear 7 having no outwardly protruding, outer peripheral margine which, according to the foregoing embodiment, supports the roller assemblies 8. More specifically, in the embodiment shown in FIGS. 12 to 15, the pedestal 2 comprises the stationary base 5 having the circular recess 4 defined therein in coaxial relationship with the upright stud shaft 3, and the generally ring-shaped turntable 6 formed with the ring-shaped driven bevel gear 7 concentric therewith and having its gear teeth oriented diagonally upwardly and generally radially inwardly of the turntable 6. As is the case with and in the same manner as in the foregoing embodiment, the bottom of the television receiver console 1 is formed with the concentric circular skirts 18 to 21 and the groove-defining walls 22a and 22b defining the respective arcuate guide grooves 17a and 17b.

The pedestal 2 so far described is identical in construction with that used in the foregoing embodiment of FIGS. 1 to 11, however, the turntable 6 has its outer peripheral face provided, or otherwise lined, with an annular friction band 6a.

The roller assemblies 8, which have been described as accommodated in the circular row of the recesses defined in the outer peripheral margin of the turntable 6 in the foregoing embodiment shown in and described with reference to FIGS. 1 to 11, are accommodated in a circular row of recesses defined in the stationary base 5 in concentric relationship with the upright stud shaft 3 and positioned radially outwardly of the circular the previous embodiment, each of them comprises a pair of support shafts extending parallel to each other in a direction radially of the recess 4 and spaced a distance from each other in a direction circumferentially of the recess 4, and a pair of rollers for each support shaft, said pair of rollers being rotatably mounted on the respective support shaft and spaced a distance from each other in a direction radially of the recess 4.

When the turntable 6 having the friction band 6a at the outer peripheral face thereof is accommodated within the recess 4 in the stationary base 5, the friction band 6a frictionally contacts the radially outer peripheral wall of the recess 4. The friction band 6a serves to provide between the turntable 6 and the stationary base 5 a frictional force greater than the drive force required for the drive mechanism 14, and hence, the drive bevel gear 28, to rotate the television receiver console 1 relative to the turntable 6.

As can readily be understood by those skilled in the art, the total weight of the television receiver console 1 including the various component parts of the television receiver set is imposed on the stationary base 5 through the roller assemblies 8, and, therefore, it may happen, in the case of a relatively heavy television receiver set, that the turntable 6 may rotate idle relative to the stationary base 5 when the drive mechanism 14 is operated.

The use of the friction band 6a is effective to avoid the above described possibility and ensures that, when the drive mechanism 14 is operated with the drive bevel gear 28 consequently driven, the television receiver console 1 can be with no fault rotated relative to the stationary base 5. It is, however, to be noted that the friction band 6a does not hamper the manual turn of the television receiver console 1 relative to the stationary base 5. In other words, even in the embodiment shown in and described with reference to FIGS. 12 to 15, the television receiver console 1 can be turned manually if the external turning force great enough to overcome the frictional force generated by the friction band 6a between the turntable 6 and the stationary base 5 is manually applied to the television receiver console 1.

Of course, the use of the friction band 6a provided at the outer peripheral face of the turntable 6 is merely one of numerous possibilities apparent to those skilled in the art. The friction band 6a shown and described as secured to the outer peripheral face of the turntable 6 may be secured to the outer peripheral surface of the recess 4. Of course, instead of the friction band 6a, an annular friction sheet may be interposed between the turntable 6 and the bottom of the recess 4 in the stationary base 5.

From the foregoing detailed description of the present invention, it is clear that the following numerous advantages can be appreciated. In the first place, since the drive mechanism 14 is positioned at such a location where the presence of the drive mechanism 14 will not provide an obstruction to the selective insertion and removal of the cathode ray tube 13 into and out of the television receiver console 1, which insertion and removal would be required for servicing purpose, and where the drive mechanism 14 is spaced a substantial distance from the high voltage electric circuit such as including the flyback transformer 11 within the television receiver console 1, not only is the drive mechanism required to be removed, but also no obnoxious discharge which would otherwise bring about damages to the television receiver set as well as the drive mechanism 14 would occur between the drive mechanism 14 and the high voltage circuit.

The use of the sound generator, either mechanical or electric, is advantageous not only in that the television viewer or viewers can be informed of the rotation of the television receiver console 1 taking place, but also in that any possible offensive sounds generated by the motor 24 or its associated parts can be advantageously masked.

Although the use of the radially outermost skirt 21 seems not to be essential in the practice of the present invention, the use thereof is effective to minimize or substantially avoid any possible entry of dust and foreign matter into a space between the bottom of the television receiver console 1 and the stationary base 5 and above the turntable 6. A pile-up of dusts and foreign matter within the space between the television receiver console 1 and the stationary base 5 would reduce the performance of the roller assemblies 8 and the limit switches 23a and 23b and/or would lead to damages to one or both of the bevel gears 28 and 7 accompanied by a loss of the driving force. The groove-defining walls 22a and 22b at the bottom of the television receiver console 1 are also effective to avoid the entry of dusts into the limit switches 23a and 23b.

Since the turntable 6 having the driven bevel gear 7 is seated within the circular recess 4 in the stationary base 5, the distance over which the driven bevel gear 7 protrudes upwardly from the level of the upper surface of the stationary base 5 is minimized and, therefore, the distance over which each of the skirts 18 to 21 protrudes downwardly from the bottom of the television receiver console 1 is correspondingly small with no dust preventive capability being reduced.

In any event, the skirts 18 to 21 serve as legs for the support of the television receiver console 1 when the latter is separated from the pedestal 2 and placed on any suitable surface, for example, on the top of a cabinet or a desk. The separable feature according to the present invention is very convenient where the stationary base 5 is constituted by the top of the cabinet, permitting the television receiver set and the cabinet to be carried separately from place to place within a house. It is to be noted that, when the television receiver console 1 itself is placed on any suitable surface after having been separated from the pedestal 2, the skirts 18 to 21 prevent the drive bevel gear 28 and the limit switches 23a and 23b from contacting the surface thereby minimizing any possible damages to the drive bevel gear 28 and the limit switches 23a and 23b. Nevertheless, when the television receiver console 1 is mounted on the stationary base 5 from above with the upright stud shaft 3 engaged into the circular bearing wall 16, the drive bevel gear 28 is automatically engaged with the driven bevel gear 7 on the turntable 6.

The fact that the limit switches 23a and 23b are secured to the television receiver console 1 through the switch carrier plate 33 and are electrically connectable through the connector 34a with an electric circuit arrangement carried by the chassis 9 is advantageous in that the positioning and/or removal of the limit switches 23a and 23b can be carried out with no need to remove and insert the chassis 9, but merely requiring the connection of the connector 34a with the mating connector leading to the electric circuit in the chassis.

Although the present invention has been fully described in connection with the preferred embodiments thereof with reference to the accompanying drawings, it is to be noted that various changes and modifications can readily be conceived by those skilled in the art without departing from the spirit and scope of the present invention as defined by the appended claims. By way of example, although reference has been made to the use of the pair of the radially spaced two rollers on each shaft of each roller assembly, the number of the radially spaced rollers on each shaft of each roller assembly may no be limited to two, but may be one or more than three, in which case the number of the skirts which rest on the radially spaced rollers should be decreased or increased correspondingly.

Moreover, although each roller assembly has been described and shown as including the pair of the circumferentially spaced shafts each carrying the pair of the radially spaced rollers, it may include one or more than three shafts.

Although the roller assemblies have been shown and described as arranged on the turntable 6 or the stationary base 5 while the skirts 18 to 21 have been shown and described as formed with the bottom of the television receiver console 1, the roller assemblies may be arranged on the bottom of the television receiver console 1 while the skirts 18 to 21 may be formed with the stationary base.

Accordingly, such changes and modifications should be construed as included within the scope of the present invention unless they depart therefrom.

What is claimed is:

1. A remote-controlled, motor-driven swivel support structure which comprises a console; a pedestal for the support thereon of the console for angular movement from a neutral position to any one of leftward and rightward positions, said pedestal comprising a stationary and a generally ring-shaped turntable rotatably mounted thereon, said turntable having a generally ring-shaped driven bevel gear provided thereon in concentrical relationship with the axis, about which the console is rotatble, so as to face upwardly, said pedestal also including a plurality of roller assemblies arranged in a circular row concentrical with the turntable and spaced a predetermined distance from each other in a direction circumferentially of the turntable for the support of the weight of the console; and a drive mechanism including remote-controlled, reversible drive motor and a drive bevel gear drivingly coupled with the drive motor, said drive bevel gear being so positioned as to partially protrude outwardly downwardly from the bottom of the console for engagement with the driven bevel gear on the turntable, the engagement between the drive bevel gear and the driven bevel gear taking place when the console is mounted on the pedestal from above.

2. The structure as claimed in claim 1, wherein the roller assemblies are arranged on the turntable.

3. The structure as claimed in claim 2, wherein the circular row of the roller assemblies is positioned radially outwardly of the driven bevel gear.

4. The structure as claimed in claim 1, wherein the driven bevel gear has its gear teeth oriented diagonally upwardly and inclined downwardly.

5. The structure as claimed in claim 1, wherein the circular row of the roller assemblies is positioned radially outwardly of the driven bevel gear, and wherein the console has its bottom formed with an annular rail means resting on the roller assemblies and a circular coaxial skirt protruding downwardly therefrom in concentrical relationship with the turntable, said annular rail means and said circular skirt being spaced in a radial direction a distance enough to accommodate the driven bevel gear therebetween.

6. A remote-controlled, motor-driven swivel support structure which comprises a console; a pedestal for the support thereon of the console for angular movement from a neutral position to any one of leftward and rightward positions, said pedestal comprising a stationary base and a generally ring-shaped turntable rotatably mounted thereon, said turntable on the stationary base and being rotatable relative to the stationary base when an external turning force greater than a predetermined value is applied to the console, said turntable having a generally ring-shaped driven bevel gear provided thereon in concentrical relationship with the axis, about which the console is rotatable, so as to face upwardly, said pedestal also including a plurality of roller assemblies arranged in a circular row concentrical with the turntable and spaced a predetermined distance from each other in a direction circumferentially of the turntable for the support of the weight of the console, said console being rotatable on the roller assemblies when a force smaller than said external turning force is applied to the console; and a drive mechanism including a remote-controlled, electrically operated reversible drive motor, said drive bevel gear being so positioned as to partially protrude outwardly downwardly from the bottom of the console for engagement with the driven bevel gear on the turntable, the engagement between the drive bevel gear and the driven bevel gear taking place when the console is mounted on the pedestal from above.

7. The structure as claimed in claim 6, wherein at least a portion of that surface area of the turntable which contacts the stationary base is applied with a friction member.

8. The structure as claimed in claim 6, wherein the stationary base has a circular recess defined therein, said turntable being seated within the circular recess.

9. The structure as claimed in claim 8, wherein the turntable has an outer peripheral face applied with a friction member which, when the turntable is seated within the circular recess, frictionally contacts the outer peripheral wall defining the circular recess.

10. The structure as claimed in claim 8, wherein the circular recess has an outer peripheral wall which, when the turntable is seated within the circular recess, contacts the outer peripheral face of the turntable, said outer peripheral wall being applied with a friction member.

11. The structure as claimed in claim 6, wherein the stationary base has a circular recess defined therein, said turntable being seated within the circular recess, and wherein said roller assemblies are arranged on the stationary base at a location radially outwardly of the circular recess.

12. A remote-controlled, motor-driven swivel support structure comprising:
 a console;
 a pedestal for the support thereon of the console for angular movement from a neutral position to any one of leftward and rightward positions, said pedestal includes a stationary base and a generally ring-shaped turntable rotatably mounted thereon, said turntable being held in frictional contact with the stationary base;
 a plurality of roller assemblies arranged on the pedestal in a circular row concentrical with the axis about which the console is rotatable and spaced a predetermined distance from each other in a direction circumferentially of the console for the support of the weight of the console, each of said roller assemblies comprising at least one shaft extending radially of the console and at least two rollers rotatably mounted on the shaft and shaped a distance from each other in a direction radially of the console;
 a driven mechanism including a remote-controlled, reversible drive motor drivingly associated with the console for angularly moving the console, said turntable being rotatably relative to the stationary base when an external turning force greater than a frictional forced produced when the console rolls on the roller assemblies is applied to the console; and
 circular skirts equal in number to the number of the rollers of each roller assembly and formed on the bottom of the console so as to protrude downwardly outwardly from the bottom of the console, said skirts resting on the respective rollers of all of the roller assemblies when the console is mounted on the pedestal.

13. The structure as claimed in claim 12, wherein the pedestal has a circular row of recesses defined therein for accommodating the roller assemblies.

14. The structure as claimed in claim 12, wherein the console is comprised of front and rear console portions and, correspondingly, each of the skirts is comprised of two generally semi-circular skirt segments, said semi-circular skirt segments having a pair of joints defined therein when the front and rear console portions are combined together to complete the console, said joints of the semi-circular skirt segments of one of the skirts being displaced in position from the joints of the semi-circular skirt segments of the other of the skirts in a direction radially thereof.

15. The structure as claimed in claim 14, wherein at least one of the joints of the skirt segments of the skirts is formed so as to extend radially slantwise.

16. The structure as claimed in claim 12, wherein the console is comprised of front and rear console portions and, correspondingly, each of the skirts is comprised of two generally semi-circular skirt segments, said semi-circular skirt segments having a pair of joints defined therein when the front and rear console portions are combined together to complete the console, said joints of the semi-circular skirt segments of one of the skirts being displaced in position from the joints of the semi-circular skirt segments of the other of the skirts in a direction circumferentially thereof.

17. A remote-controlled, motor-driven swivel support structure comprising:
 a console;
 a pedestal for the support thereon of the console for angular movement from a neutral position to any one of leftward and rightward positions, said pedestal includes a stationary base and a generally ring-shaped turntable rotatably mounted thereon, said turntable being held in frictional contact with the stationary base;
 a plurality of roller assemblies arranged on the pedestal in a circular row concentrical with the axis, about which the console is rotatable, and spaced a predetermined distance from each other in a direction circumferentially of the console for the support of the weight of the console, each of said roller assemblies comprising at least two shafts extending radially of the console and spaced a distance from each other in a direction circumferentially of the circular row, and one or more rollers rotatably mounted on each of the shafts;
 a drive mechanism including a remote-controlled, reversible drive motor drivingly associated with the console for angularly moving the console, said turntable being rotatable relative to the stationary base when an external turning force greater than a frictional forced produced when the console rolls on the roller assemblies is applied to the console, said console being rotatable relative to the stationary base through the turntable; and circular skirts equal in number to the number of the rollers of each roller assembly and formed on the bottom of the console so as to protrude downwardly outwardly from the bottom of the console, said skirts resting on the respective rollers of all of the roller assemblies when the console is mounted on the pedestal.

18. The structure as claimed in claim 17, wherein the console is comprised of front and rear console portions and, correspondingly, each said skirt is comprised of two generally semi-circular skirt segments, said semi-circular skirt segments having a pair of joints defined therein when the front and rear console portions are combined together to complete the console.

19. The structure as claimed in claim 17, wherein said joints of the semi-circular skirt segments of each skirt are formed so as to extend radially slantwise.

20. A remote-controlled, motor-driven swivel support structure comprising:
a console;
a pedestal for the support thereon of the console for angular movement from a neutral position to any one of leftward and rightward positions, said pedestal having a generally ring-shaped driven bevel gear provided therein in concentrical relationship with the axis, about which the console is rotatable, so as to face upwardly, said pedestal includes a stationary base having a circular recess defined therein and a generally ring-shaped turntable frictionally rotatably received in said circular recess; and
a drive mechanism accommodated within the console and including a support framework and a drive bevel gear rotatably carried by the support framework, said drive bevel gear partially protruding outwardly downwardly from the bottom of the console such that, when the console is mounted on the pedestal, said drive bevel gear is operatively meshed with the driven bevel gear by the effect of the weight of the console, said turntable having the driven bevel gear and being rotatable relative to the stationary base when an external force greater than the force required for the console to rotate relative to the turntable by the operation of the drive mechanism is applied to the console.

21. The structure as claimed in claim 20, wherein the driven bevel gear has its gear teeth oriented diagonally upwardly and inclined downwardly.

22. The structure as claimed in claim 9, wherein the drive mechanism also includes a remote-controlled, electrically operated reversible drive motor stationarily carried by the support framework and a drive transmission system for transmitting the drive of the drive motor to the drive bevel gear.

23. A remote-controlled, motor-driven swivel support structure comprising:
a console accommodating therein various component parts, including a cathode ray tube and a flyback transformer, of a television receiver set;
a pedestal for the support thereon of the console for angular movement from a neutral position to any one of leftward and rightward positions, said pedestal having a stationary and generally ring-shaped driven bevel gear provided thereon in concentrical relationship with the axis, about which the console is rotatable, so as to face upwardly, said pedestal also including a plurality of roller assemblies arranged in a circular row concentrical with the turntable and spaced a predetermined distance from each other in a direction circumferentially of the turntable for the support of the weight of the console; and
a drive mechanism accommodated within the console and including a remote-controlled, reversible drive motor and a drive bevel gear drivingly coupled with the drive motor, said drive bevel gear being positioned to partially protrude outwardly downwardly from the bottom of the console for engagement with the driven bevel gear on the turntable when the console is mounted on the pedestal, said drive bevel gear being operatively meshed with the driven bevel gear by the weight of the console, said drive mechanism being positioned within the console, at a location sufficiently spaced from the flyback transformer.

24. The structure as claimed in claim 23, wherein the drive mechanism comprises a support framework positioned inside the console, said drive bevel gear being rotatably carried by said support framework.

25. The structure as claimed in claim 23, wherein the console is comprised of front and rear console portions and wherein said drive mechanism is so positioned that the presence of the drive mechanism will not provide an obstruction to the selective insertion and removal of the cathode ray tube into and from the front console portion.

26. The structure as claimed in claim 23, wherein the flyback transformer is mounted on a chassis accommodated within the console at a location adjacent one of the opposite sides of said chassis and wherein said drive mechanism is positioned within the console at a location adjacent the other of the opposite sides of the chassis.

27. A remote-controlled, motor-driven swivel support structure comprising:
a console;
a pedestal for the support thereon of the console for angular movement from a neutral position to any one of leftward and righward positions;
a remote-controlled drive mechanism accommodated within the console; and
indicator means for providing an indication that the console is being turned, said indicator means comprises a pin rigidly secured to a gear element forming a part of the drive mechanism, and a sound generating piece engageable with the pin once during each complete rotation of the gear element to produce sounds.

28. The structure as claimed in claim 27, wherein the pedestal has a generally ring-shaped driven bevel gear provided thereon in concentrical relationship with the axis of rotation of the console, said driven bevel gear having its gear teeth facing upwards, said drive mechanism including a remote-controlled, electrically operated reversible drive motor, a drive bevel gear engageable with the driven bevel gear and a drive transmission system including at least one intermediate gear for transmitting the drive of the drive motor to the drive bevel gear to drive the driven bevel gear, and wherein said indicator means comprises an actuating pin rigidly secured to the intermediate gear or to the drive bevel gear and engageable with a sound generating piece, each time the intermediate gear or the drive bevel gear undergoes each complete rotation, to produce audible sounds.

29. The structure as claimed in claim 28, wherein said sound generating piece is rigidly supported by a support framework used for rotatably supporting the drive bevel gear and the drive transmission system.

30. The structure as claimed in claim 27, wherein the pedestal has a stationary base and a generally ring-shaped driven bevel gear provided thereon in concentrical relationship with the axis of rotation of the console, said driven bevel gear having its gear teeth facing upwards, said drive mechanism including a remote-controlled, electrically operated reversible drive motor and a drive bevel gear drivingly coupled with said driven bevel gear, and wherein said indicator means comprises an actuating pin rigidly secured to the drive bevel gear and engageable with a sound generating piece, each time said drive bevel gear undergoes each complete rotation, to produce audible sounds.

31. A remote-controlled, motor-driven swivel support structure which comprises a console; a pedestal including a generally ring-shaped turntable mounted thereon, said ring-shaped turntable having a generally ring-shaped driven bevel gear provided therein in concentrical relationship with the axis of rotation of the turntable with its gear teeth facing upwards; a plurality of roller assemblies arranged in a circular row concentrical with the turntable and spaced a predetermined distance from each other in a direction circumferentially thereof for supporting the console for rotation from a neutral position towards any one of leftward and rightward positions; a drive mechanism accommodated within the console and including a drive bevel gear engageable with the driven bevel gear when the console is mounted on the pedestal; and a circular dust preventive skirt means protruding downwardly from the bottom of the console in concentrical relationship with the axis of rotation of the console and shielding the drive and driven bevel gear radially exteriorly to avoid any possible entry of dusts and foreign matter into a space between the console and the pedestal.

32. The structure as claimed in claim 31, further comprising an additional circular skirt protruding downwardly from the bottom of the console in concentrical relationship with said dust preventive skirt means and positioned radially inwardly of the driven bevel gear such that said drive and driven gears are positioned between the dust preventive skirt means and said additional circular skirt.

33. The structure as claimed in claim 31, wherein the drive bevel gear of the drive mechanism is positioned inwardly of the dust preventive skirt means with respect to the bottom of the console, and, correspondingly, said driven bevel gear, when the console is mounted on the pedestal, protruding inwardly of the dust preventive skirt means with respect to the bottom of the console for engagement with the drive bevel gear.

34. The structure as claimed in claim 31, further comprising a plurality of roller assemblies for the support thereon of the console, said roller assemblies being arranged on the pedestal in a circular row concentrical with the driven bevel gear and spaced a predetermined distance from each other in a direction circumferentially of the circular row, said roller assemblies being positioned inwardly of the dust preventive skirt means and radially outwardly of the driven bevel gear, and an annular rail protruding downwardly from the bottom of the console in concentrical relationship with the dust preventive skirt means and positioned radially inwardly thereof, said annular rail being, when the console is mounted on the pedestal, resting on the roller assemblies to support the weight of the console and also to reduce a friction which would occur when the console is rotated relative to the turntable.

35. The structure as claimed in claim 31, wherein the pedestal has a stationary base, said stationary base being formed with a circular recess in which the turntable is frictionally rotatably accommodated.

36. The structure as claimed in claim 31, wherein the pedestal has a stationary base, said stationary base being formed with a circular recess in which the turntable is frictionally rotatably accommodated, and wherein the drive bevel gear of the drive mechanism is positioned inwardly of the dust preventive skirt means with respect to the bottom of the console, and said driven bevel gear, when the console is mounted on the pedestal, protruding inwardly of the dust preventive skirt means with respect to the bottom of the console for engagement with the drive bevel gear.

37. A remote-controlled, motor-driven swivel support structure which comprises a console; a pedestal for the support thereon of the console for angular movement from a neutral position to any one of leftward and rightward positions, said pedestal including a stationary base and a generally ring-shaped turntable frictionally rotatably mounted thereon, said turntable having a generally ring-shaped driven bevel gear provided thereon in concentrical relationship with the axis, about which the console is rotatable, so as to face upwards; a drive mechanism including a remote-controlled, electrically operated reversible drive motor and a drive bevel gear drivingly coupled with the drive motor, said drive bevel gear being so positioned as to partially protrude outwardly downwardly from the bottom of the console for engagement with the driven bevel gear when the console is mounted on the pedestal; a pair of stoppers provided on the pedestal and spaced a predetermined angle from each other with respect to the axis of rotation of the console; a switch carrier plate secured to the bottom of the console; and a pair of limit switches rigidly carried by said switch carrier plate and spaced a predetermined distance from each other in a direction circumferentially of the turntable for selective engagement with the stoppers, said limit switches being so positioned as to define said leftward and rightward positions, respectively, and electrically connected with the drive mechanism for interrupting the operation of the drive mechanism when any one of the limit switches is actuated by the corresponding stopper.

38. The structure as claimed in claim 37, wherein the bottom of the console has a circular skirt formed therewith so as to encircle the limit switches.

39. The structure as claimed in claim 37, wherein the bottom of the console has a pair of arcuately extending groove-defining wall members formed therewith so as to protrude downwards therefrom, each of said groove-defining wall members defining an arcuate guide groove in which the respective stopper is relatively moved during the rotation of the console.

40. A remote-controlled, motor-driven swivel support structure comprising:
a console;
a pedestal for the support thereon of the console for angular movement from a neutral position to any one of leftward and rightward positions;
a remote-controlled drive mechanism accommodated within the console; and
indicator means for providing an indication that the console is being turned, said indicator means comprises a sound synthesizer and sound outputting means for producing audible sounds synthesized by the sound synthesizer.

* * * * *